United States Patent [19]
Pak et al.

[11] Patent Number: 4,562,792
[45] Date of Patent: Jan. 7, 1986

[54] APPARATUS FOR CONTROLLING LEAD DISTANCE OF A DOG LEASH

[76] Inventors: In B. Pak, #16 Eu Ju Ro 2 Ga Chung-Ku; Soon Kim, Apt. 527-1410 #27 Jam Sil-Dong Kangoong-Ku, both of Seoul, Rep. of Korea

[21] Appl. No.: 659,441

[22] Filed: Oct. 10, 1984

[30] Foreign Application Priority Data

Dec. 7, 1983 [KR] Rep. of Korea .................. 10366/83
Feb. 28, 1984 [KR] Rep. of Korea .................... 1674/84

[51] Int. Cl.⁴ ............................................ A01K 27/00
[52] U.S. Cl. ................................................. 119/109
[58] Field of Search ...... 119/109; 24/132 R, 132 WL

[56] References Cited

U.S. PATENT DOCUMENTS

| | | | |
|---|---|---|---|
| 2,776,644 | 1/1957 | Fontaine | 119/109 |
| 3,693,596 | 9/1972 | Croce et al. | 119/109 |
| 3,937,418 | 2/1976 | Critelli | 119/109 X |
| 4,308,643 | 1/1982 | Montplaisir | 24/132 R |
| 4,391,226 | 7/1983 | Guthrie | 119/109 |

*Primary Examiner*—Hugh R. Chamblee
*Attorney, Agent, or Firm*—Kenyon & Kenyon

[57] ABSTRACT

An apparatus having a mechanism for easily controlling the length of a dog leash while avoiding injury to the hand, the apparatus case being formed round and flat to fit comfortably in the palm of the hand; a passageway of said case allowing free passage of a leash through the fingers, the case and palm; the length of the leash controlled by means of a rotating lever which applies pressure against the passageway surface.

5 Claims, 4 Drawing Figures

APPARATUS FOR CONTROLLING LEAD DISTANCE OF A DOG LEASH

BACKGROUND OF THE INVENTION

The present invention relates to an apparatus for controlling the lead distance of a leash when walking a dog, in particular, a special mechanism by which a person can optionally control the distance between the dog and walker.

Generally, when dog owners walk their dog, the lead distance the walker must maintain is a function of the length of the conventional leash.

Accordingly, up to now, to control the lead distance, the owner has had to wind or unwind the leash in the hand or around the wrist, causing the hand to go to sleep and sometimes causing serious injury due to the pull of powerful dogs. Needless to say the conventional leash is very inconvenient.

SUMMARY OF THE INVENTION

The object of the invention is to provide a controlling apparatus for adjusting the length of a leash, thereby controlling lead distance when walking a dog.

In accordance with this invention, the external form of the apparatus comprises a round, flat shaped device which is grapsed in the palm. As the grip is tightened or loosened the lead distance is adjusted, accordingly the result being the ability to easily walk a dog without any inconvenience or injury to the hand.

In the present invention, the outer edge of the apparatus case is formed round and flat allowing entry and exit of a leather, cloth, or other material leash either forward or backward through the apparatus.

Accordingly, if the user grasps said apparatus, the leash runs between the index and middle fingers leaving the back of the palm free.

To equalize the pulling force of the leash between the dog and the hand, said pulling force is controlled by pressure of the plam of said apparatus.

Within the said apparatus is formed a passageway for a leash which runs through the front and rear entrances, the passageway surface having an inclined plane in the center and a rotating lever device which applies pressure against the leash on said inclined plane. The end of the rotating lever is always operated by a spring to adjust the leash length against the inclined plane in accordance to the pull of the dog. The more the dog pulls the leash, the greater is the force with which the leash is pressed against the plane by said lever.

Therefore, in accordance with this invention, the length of the leash may be easily controlled whether the dog pulls forward or the leash is taken backward. The operating part of the said rotating lever extends out over the exterior edge of said lever as a means to control the desired length of the leash. By pushing said lever with the thumb, the other end of said lever is broken from contact with the leash surface thereby allowing the leash to run freely within the apparatus.

DESCRIPTION OF PREFERRED EMBODIMENTS

Figure 1:
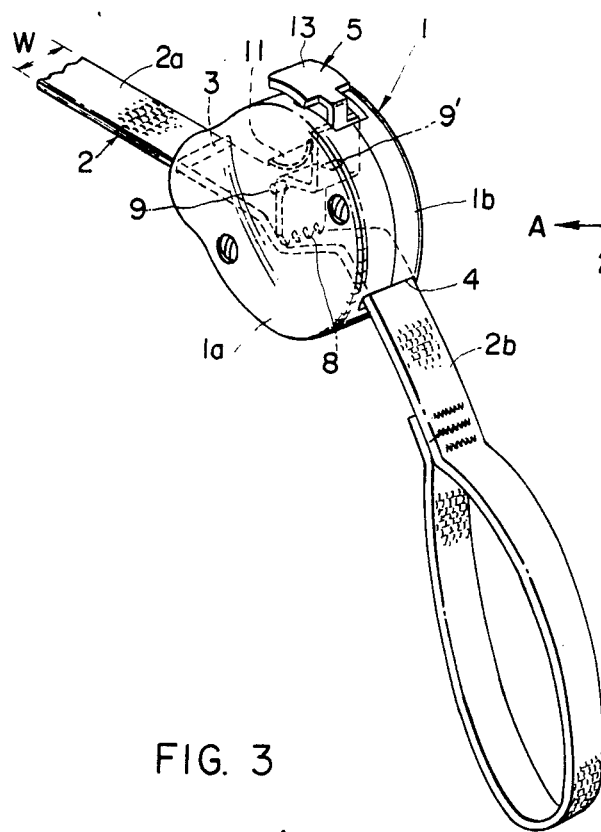
FIG. 1 shows the perspective view of the apparatus having the controlling mechanism for the dog leash length of the present invention.
Figure 2:
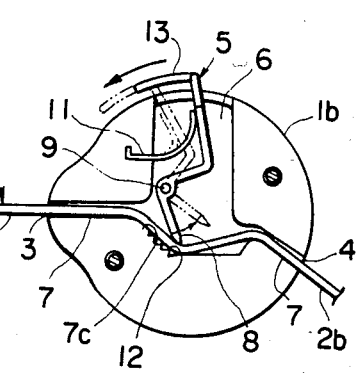
FIG. 2 shows the vertical sectional view of the apparatus of the present invention.

In FIG. 1, the case 1 is composed of elements 1a, 1b, both made of plastic. Each of these elements 1a, 1b is symmetric to the other and define an inside passageway 7 which houses a controlling mechanism for a length of leash 2. As indicated in FIG. 2, the passageway 7 communicates with slotted holes 3, 4 in the front and back of the case 1. The belt-type leash 2 is inserted and weaved through the passageway 7. In this respect, the passageway 7 is slightly wider than the width of the leash 2 in order to allow free passage of the leash 2. In addition, the passage 7 has an inclined plane or surface 7c against which the leash 2 is pressed and held firm by the end 8 of a rotating lever 5. The rotating lever 5 operates to apply pressure against the inclined plane 7c and rotates within the interior walls of the elements 1a, 1b. The end of the rotating lever 5 is supported by a plate spring 11 which acts to provide a constant pressure of the lever end 8 against the inclined plane 7c in order to compress and firmly hold the leash 2.

The corrugated grooves 12 which prevent slippage of leash 2 when compressed and held by pressure of lever 5, are present on the inclined plane 7c of the passageway 7. The toothed shape of lever end 8 also prevents slipping of leash 2.

Namely, lever end 8 presses leash 2 against corrugated surface 12 when a dog pulls on leash 2.

Therefore, the compressing force and holding strength of the rotating lever 5 on leash 2 against the inclined plane 7c is proportional to the pulling force of the leash 2 by a dog. Number 10, 10' are bolts for connecting the elements 1a, 1b together (FIG. 2).

In accordance with the present invention, the apparatus case having symmetrically concurrent elements 1a, 1b is formed round and flat in shape, having a volume sufficient to completely cover the palm (FIG. 3), and has a width determined by the width of leash 2.

Figure 3:
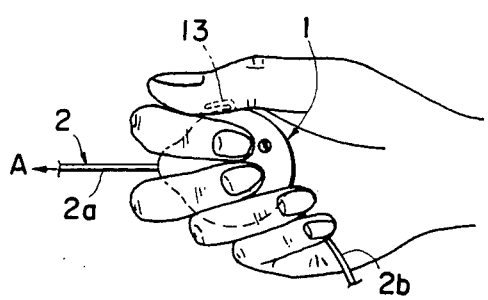
FIG. 3 shows the apparatus of the present invention as is used in the hand.
Figure 4:
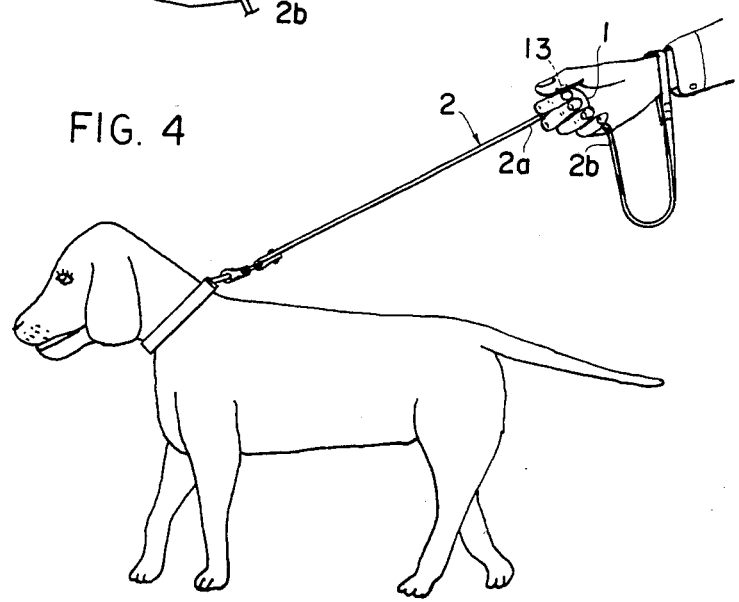
FIG. 4 shows use of the present invention in walking a dog.

By means of the slotted holes 3, 4 formed in the front and hear portions of the case, the leash 2 may be passed smoothly between the index and middle fingers, and leash 26 into the palm without any impediment as shown in FIG. 3 and FIG. 4.

Therefore, the force of any pull in direction A passes through the front of case 1 and is transferred completely to the palm. The pulling force is dissipated by controlling hand pressure, thereby converting it into the palm with which the case is grasped. Thus, pulling force by leash 2 in direction A causes no injury to the hand.

In accordance with this invention, part 13 of rotating lever 5 protrudes out from the exterior edge of case 1 and is used to control the length of leash 2 by applying pressure to it with the thumb, thereby releasing pressure of said lever 5 from leash surface 2 which is normally pressed against inclined plane 7c. Thus, by applying thumb pressure to part 13 of rotating lever 5, leash 2 is released and passes freely in passageway 7. When thumb pressure is stopped, lever end 8 returns to solid line (FIG. 2) by plate spring 11.

Thus, by pressing part 13 of lever 5, leash 2 may be lengthened or shortened through slotted holes 3 or 4. Plate spring 11 restores pressure against corrugated grooves 12 when thumb pressure against part 13 of lever 5 is released.

Therefore, the effect of the controlling apparatus of the present invention is to allow easy control of leash length when walking a dog at the same avoiding any injury to the hand.

What is claimed is:

1. An apparatus for controlling the length of a dog leash, said apparatus comprising a round flat case to fit the palm of a hand, said case having a slotted hole at a front thereof, a slotted hole at a rear thereof, an interior passageway connected with each said slotted hole for passage of a leash therethrough, and an inclined plane within said passageway for abutting the leash;

a thumb-actuated lever rotatably mounted in said case within said passageway for pivoting forwardly and away from said inclined plane to release the leash from said inclined plane and a spring in said case biasing said lever against said inclined plane for pressing a leash in said passageway against said inclined plane.

2. An apparatus as set forth in claim 1 wherein said case is made of two concurrent elements.

3. An apparatus as set forth in claim 1 wherein said lever has a part projecting from said case for application of thumb pressure thereon.

4. An apparatus as set forth in claim 1 which further comprises a plurality of corrugated grooves in said inclined plane.

5. An apparatus as set forth in claim 4 wherein said lever has a tooth-shaped end opposite said inclined plane.

* * * * *

UNITED STATES PATENT AND TRADEMARK OFFICE
CERTIFICATE OF CORRECTION

PATENT NO.   : 4,562,792

DATED        : January 7, 1986

INVENTOR(S)  : In B. PAK

It is certified that error appears in the above-identified patent and that said Letters Patent is hereby corrected as shown below:

```
Column 1, line 41 change "plam" to -palm-
Column 2, line 45 change "hear" to -rear-
Column 2, lines 46-47 change ", and leash 26" to -through
   the case 1-
Column 2, line 54 change "pulling force" to -a pulling
   force-
Column 2, line 55 change "leash 2" to -the leash 2-
Column 2, line 55 change "A causes" to -A (see Fig. 3)
   causes-
Column 2, line 60 change "said lever 5" to -the lever 5-
Column 2, line 61 change "inclined plane 7c" to -the
   inclined plane 7c-
```

Signed and Sealed this

Twenty-seventh Day of May 1986

[SEAL]

Attest:

DONALD J. QUIGG

Attesting Officer

Commissioner of Patents and Trademarks